5854X
Webb & Coe,
Cheese Press.
Patented Feb. 27, 1830.
Fig; 1.
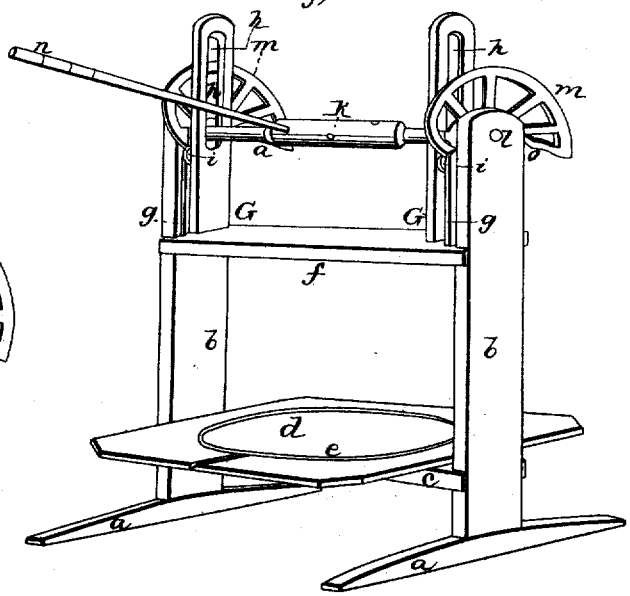
Fig; 2.
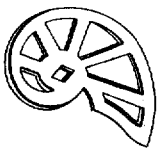
AM. PHOTO-LIT'HO. CO. N.Y. (OSBORNE'S PROCESS)

Feb. 27. 1830 61

Reynold Webb & Jonathan Coe
Letters Patent X5854

The Schedule referred to in these Letters Patent and making part of the same containing a description in the words of the said Reynold Webb & Jonathan Coe themselves of their improvement in the common press used for pressing Cheese &c.

To all person to whom these presents shall come Be it known that we Reynold Webb & Jonathan Coe both of Madison, County of New Haven, State of Connecticut have jointly invented a new & useful improvement in the common press used for pressing Cheese & for other similar purposes, which improvement or invention we specify and describe in manner following (viz.)

To show the nature, properties & extent of our improvement we here describe a portable press of a size suitable for pressing the cheese made from an ordinary dairy & so constructed as to admit of a convenient application of the principle of our invention. The drawing annexed exhibits a perspective view of the machine here described & references are made to the same in this description. In the construction of the machine some kind of hard wood, such as oak or maple which will work neatly & fit accurately should be used. The foot pieces or sills (a. a.) are two feet long, two inches wide & two inches thick. To these foot pieces are firmly framed two upright or perpendicular pieces (b. b.) two feet four inches long three & a half inches wide & two inches thick. To these upright pieces & six inches distance from the foot pieces is fitted or framed a cross piece (c) one foot & ten inches long seven inches wide & two inches thick to form a base to support the substances to be pressed. This joins the upright pieces in a direction perpendicular to the foot pieces. Upon this base a board or plank (d) is placed of sufficient size to support the substan[illegible]

X5854

[illegible] to be prepared with a channel (e e) cut in a circular or oval
form & leading off from one edge of the frame in order to deliver
any liquid matter which may be discharged — A second cross
piece (f f) parallel to the first, one foot & ten inches long seven inches
wide & two inches thick, is fitted with a notch at each end
of the width of the perpendicular pieces so as to slide freely up &
down as the pressure is applied or removed — Into each end of
this last piece are framed two upright or perpendicular pieces
(g.g.) (g.g.) & the [illegible] two pieces which form each pair are
three fourths of an inch distant from each other. The two
outer pieces of each pair (g.g.) are four & a half inches long & three
& a half inches wide & three fourths of an inch thick & rounded
at top. The two inner pieces (g.g.) are one foot three inches
long – three & a half inches wide & one inch thick, & in the up
per part of these inner pieces are two mortises or openings (h.h.)
eight and a half inches long & two inches wide rounded at each
end of the openings & the whole pieces rounded at the top —
Between each of these pairs of upright pieces & one & a half
inch distance from the ends of the shorter pieces is placed a small
wheel (i.i.) two inches in diameter & three fourths of an inch
thick with pins running thro' the pairs of upright pieces &
thro the centre of each wheel half an inch in diameter & the
~~the~~ wheels & pins are formed of iron, brass, or other hard metal.
There is a third cross piece (k.) circular in its shape but
largest in the middle. the circumference at the ends is six
inches & in the middle eight inches with three or more holes
near the middle one inch in diameter intended to receive a
lever. This cross piece is one foot six inches long & in each
end of it is placed a metal gudgeon (l.) five inches in length
which may run in a metal box placed in the upper part of each
upright piece (l. l.) & three inches from the top of the same. The
gudgeons & boxes should be iron or brass or other hard metal.
The two ends of the circular cross piece are made square for

X3854 the distance of one inch & a quarter from each end, & each side of
the square is one inch & a half. Upon these square parts are
fitted two curved or spiral, or scroll pieces made of iron or
other hard metal (m, m,) five eighths of an inch in thickness
with open work & braces so as to secure both lightness & strength,
but where these are not regarded they can be solid & these are to
be so fitted as to run upon the wheels (i. i.) with accuracy,
when the circular cross piece (k.) is turned round by means
of the lever (n,) of suitable length & size & fitted to enter the
holes in the same. This lever also may have two or three
or more notches or grooves cut round the same so that when
a constant pressure is needed a weight may be hung up-
on the lever when in an elevated position ) & not slide
down towards the circular cross piece. The weight to be ap-
plied may be a stone, bag of sand, or other suitable heavy
matter. When a constant pressure is not needed, any oth-
er common power may be applied. By varying the size
& proportion of the parts presses may be made larger or smal-
ler according to the use to which they are to be applied,
also the curved spiral or scroll pieces (m. m.) of shape as
represented in the annexed drawing will by means of the pro-
jections (o. o,) fitting to the wheels (i. i.) when the cross piece (f)
is raised as high as it can be hold up & support the cross piece
(f.) from descending by its own weight, which may be some
convenience in using the press. The curved spiral or scroll
pieces may be formed with the outer edge or periphery diver-
ging more or less rapidly from the central point, but our experi-
ence leads us to the conclusion that a curve or spiral which
at the point on the circumference where it is first made to op-
erate is one inch & a half distant. measured on a radius or or-
dinate from the centre of its motion in order to give it suitable
thickness & strength, & at the distance of [illegible] inches measured
from the first mentioned point upon the periphery, has diverged
the

X6854 three inches from the centre of motion measured on a radius or ordi-
nate; And again at the distance of twenty inches measured
from the first mentioned point & measured on the periphery or out-
er curve, is five inches & one quarter distant from the centre of
motion measured on a radius or ordinate, is best adapted to
the press of the size we have described & in the same ratio or pro-
portion for larger or smaller presses. Fig 2 Exhibits a spiral
detached from the machine. To use the press the cross piece (f,)
is raised by blocking on the substance to be pressed, till the small
wheels (i, i,) come in contact with the spiral pieces (m, m,)
& if you wish to move the cross piece (f,) thro' all the distance
which it can be carried by the spirals (m, m,) you bring the
wheels (i, i,) and the spirals (m, m,) in contact as near to
the central points of the spirals (m, m,) as possible, then introduce
the lever (n) into the holes in the circular cross piece (k,) & the
weight or other power is applied to the lever (n) causing the
cross piece (k) to revolve & carry with it the spirals (m, m,)
which press upon the wheels (i, i,) which also revolve & the spi-
rals (m, m,) press down the cross piece (f,) with great force upon
the substance placed under it & intended to be pressed. while
the cross piece (f,) by means of the mortises (h, h,) in the upright
pieces (g, g,) is kept parallel to the base (c,) & base board (d,)
& each side of the substance pressed is kept of the same thick
ness or width. This press is simple in its construction easily
managed & kept in order. portable & possesses great power,
which is easily brought into operation & very little retarded
or diminished by friction. With perhaps slight variations
in construction presses may be formed upon this plan, &
with our improvements adapted to almost any purpose
for which presses are used. What we claim as our inven
tion or improvement is the combination of the powers of the [illegible]
and wedge or inclined plane by means of the circular cross
piece & the curved, spiral, or scroll pieces attached to the [illegible]
[illegible]

X5854 thereof & operating on the two small wheels as described & set forth in the foregoing specification whereby great power to press is obtained & that power made to operate in a convenient cheap & uniform manner & with but a small loss of power by friction. But we do not claim as any part of our invention the whole or any of the parts of the above described press, now or formerly in use or the particular size or shape of the same any farther than is necessary to combine the above powers & bring them to operate in combination & remove or lessen friction during their operation Witnesses
Jonathan T. Todd.
Luther Crane Reynold Webb
Jonathan Coe 1630 [illegible]

Exd.
[illegible]